July 24, 1956 R. TÖRNKVIST 2,755,690
HAND ADJUSTMENT FOR A TRANSVERSELY SLIDE BLOCK MOUNTED CUTTER
Filed Oct. 27, 1950 3 Sheets-Sheet 1

INVENTOR.
Rolf Tornkvist,
BY Wenderoth, Lind & Ponack
ATTYS.

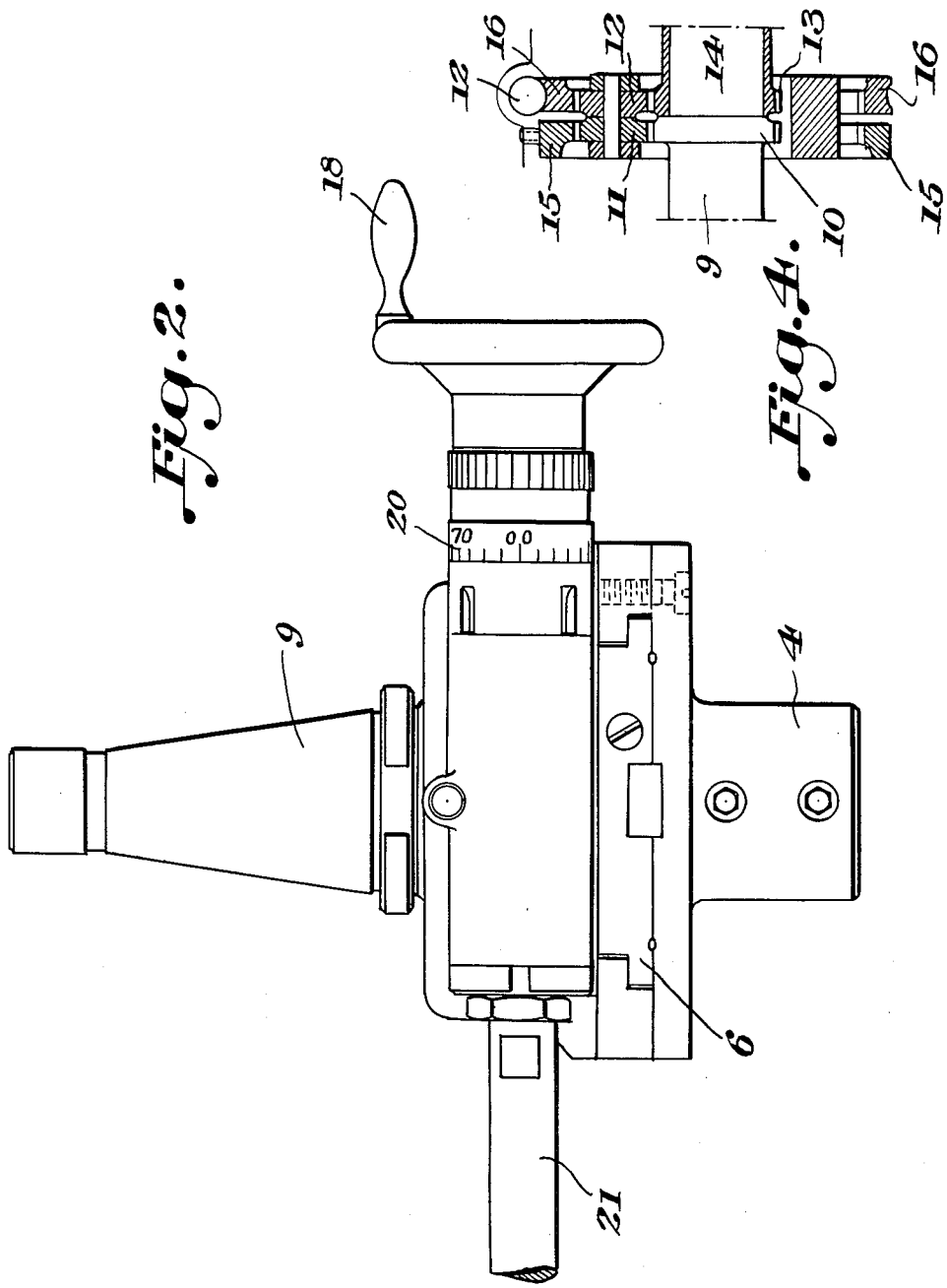

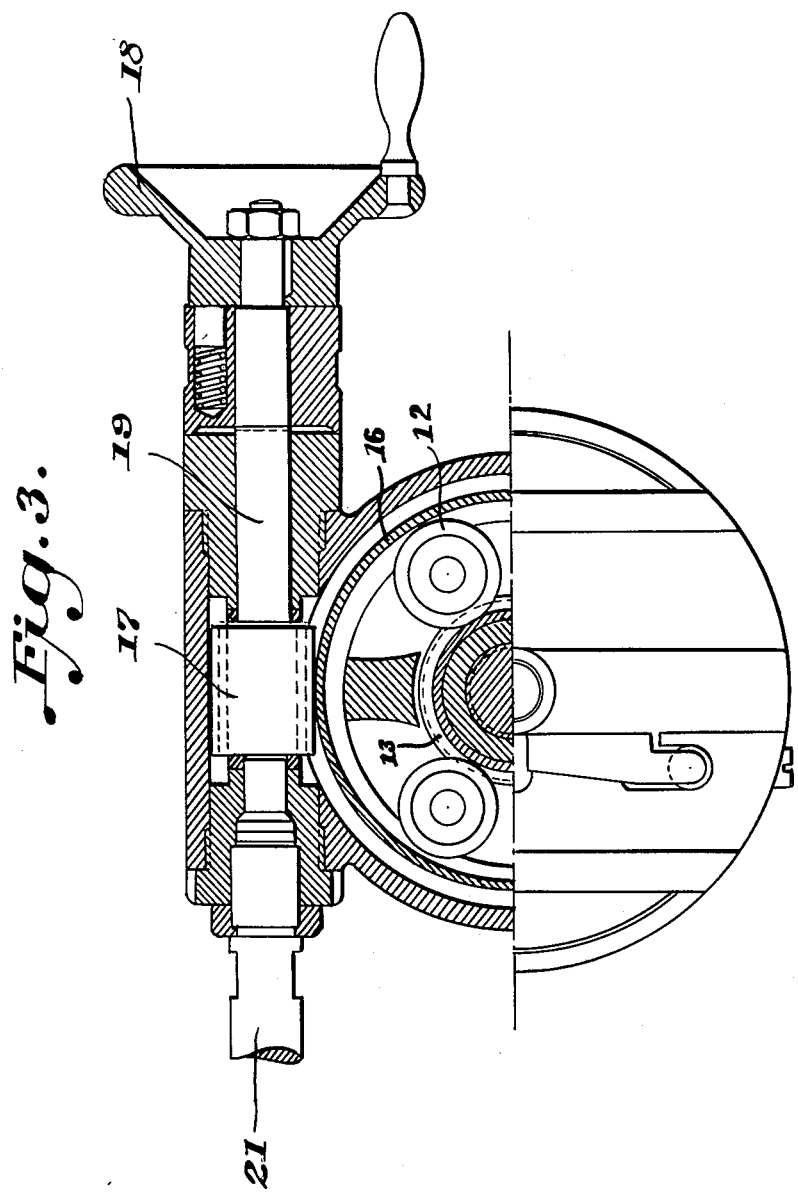

United States Patent Office 2,755,690
Patented July 24, 1956

2,755,690

HAND ADJUSTMENT FOR A TRANSVERSELY SLIDE BLOCK MOUNTED CUTTER

Rolf Törnkvist, Helsingfors, Finland

Application October 27, 1950, Serial No. 192,394

Claims priority, application Finland November 18, 1949

1 Claim. (Cl. 77—58)

The present invention relates to a new and improved radial adjustment for a transversely slide block mounted cutter provided with a scroll actuated slide block as is used with machine driven tools such as drill heads and milling cutters. The characteristic new feature of the support is that a special differential arrangement is arranged to cooperate with a hand wheel fitted with a graduated scale and connected to a spindle for fixing the radial calibrated adjustment means through the support device in such a way that the tool may be adjusted in a direction vertically to the rotating axis of the tool without it being necessary to stop the revolving movement of the tool.

In order to aid in the understanding of the novel features of the support device according to the invention, the following description will at first give a general view of the construction and functioning of different kinds of differential devices.

The general so-called differential planetary devices employed in machine tools consist of two rotatable co-axial gears having interposed therebetween and arranged in direct drive therewith planet gears carried in a shell or frame rotatably and co-axially arranged with the two first-mentioned gears.

Generally, differentials have for their object to permit relative angular adjustment between the three co-axially rotatable elements, planet gear, sun gear, and internal gear, constituting the differential. Therefore, the relative rotation of the elements is such that the degree of rotation of a single element is always determined by the degree of rotation of the two other elements and vice versa.

A special type of conventional differential is one in which the planet gears are disposed between two concentric gears arranged on the same shaft. In this differential the co-axial gears are arranged as one outer ring gear with internal spur teeth, hereinafter called the internal gear, and one inner gear, hereinafter called the sun gear, with external gear teeth. The sun gear and the internal gear are co-axially disposed one within the other in the same plane. Interposed between the internal gear and the sun gear are the planet gears, which are mounted on shafts which are fixed to a ring turnable co-axially with the sun and the internal gears.

A characteristic feature of these known differentials is, as already mentioned, the relative angular adjustability of the three co-axial elements. If the gear located on the one side of the planet gears is turned a certain amount in one direction, the gear on the other side of the planet gears turns a corresponding degree in the opposite direction, provided the ring on which the planet gears are mounted is stationary.

A variation of these differentials consists of the double or multiple differentials. In the double differential two simple differentials are arranged side by side, in such a way that elements from each of the two differentials are so combined to form a turnable element common to the two differentials.

In a double differential, for instance, the planet gears in each of the differentials may be disposed in pairs side by side on common shafts carried by a ring common to both differentials.

In a triple or multiple differential three or more planet gears, i. e., one from each differential, are arranged side by side on the same shaft, and the support for the planet gear shafts is common to all the differentials.

If, in such a differential arrangement, the sun gear of the first differential is set in rotation, while the internal gears in both differentials are kept stationary, the sun gear of the second differential will rotate with the same speed, and in the same direction as the first-mentioned sun gear. However, it is possible to cause a momentary angular displacement between the sun gears by arranging the internal gears in such as way that, by means of special control devices, they may be rotated relative to each other.

If when the sun gears and planet gears rotate, one or both of the initially stationary internal gears are turned, the turning of the sun gears is directly affected in such a way that one sun gear will be retarded or accelerated relative to the other. Consequently an angular displacement in the direction of rotation will occur between said two sun gears.

Now according to the invention a differential device of this special type is applied to a new and improved support device for the tool head in boring machines, milling cutters and the like machines, where the workpiece is stationary and the tool rotates.

In this new tool support according to the invention a multiple differential, e. g. a double differential, is utilized in such a way that the sun gear of the one differential is connected to the driving element of the machine, consequently serving as the power intake for the tool support, while the other sun gear, serving as power output, is connected to the revolving tool head.

The angular movement of the two sun gears relative to each other is used for effecting displacement of the tool head in a direction perpendicular to the rotation axis of the tool.

The present invention may be summarized as a transversely mounted rotatable and radially adjustable cutter provided with a scroll actuated slide block and a differential gear mounted hand wheel in the head of said slide block, the improvement comprising a fine adjustment worm gear connecting said hand wheel to said differential, an internal gear in said differential driven by said worm gear for radial reciprocation of said cutter, while said cutter is driven by a main drive shaft, a spindle fixedly connected to said differential to serve as the calibrating base for said radial adjustment of said slide block, adjustable chucking means on said differential to fix said spindle in proper relation, and a calibrated collar on said hand wheel. The invention will now be more fully described with reference to the accompanying drawings.

Fig. 2 is a face view of an embodiment of the invention.

Fig. 3 is a view partly in section and partly in perspective of an embodiment of the invention.

Fig. 4 is a sectional view of a detail of the invention.

Figure 1:
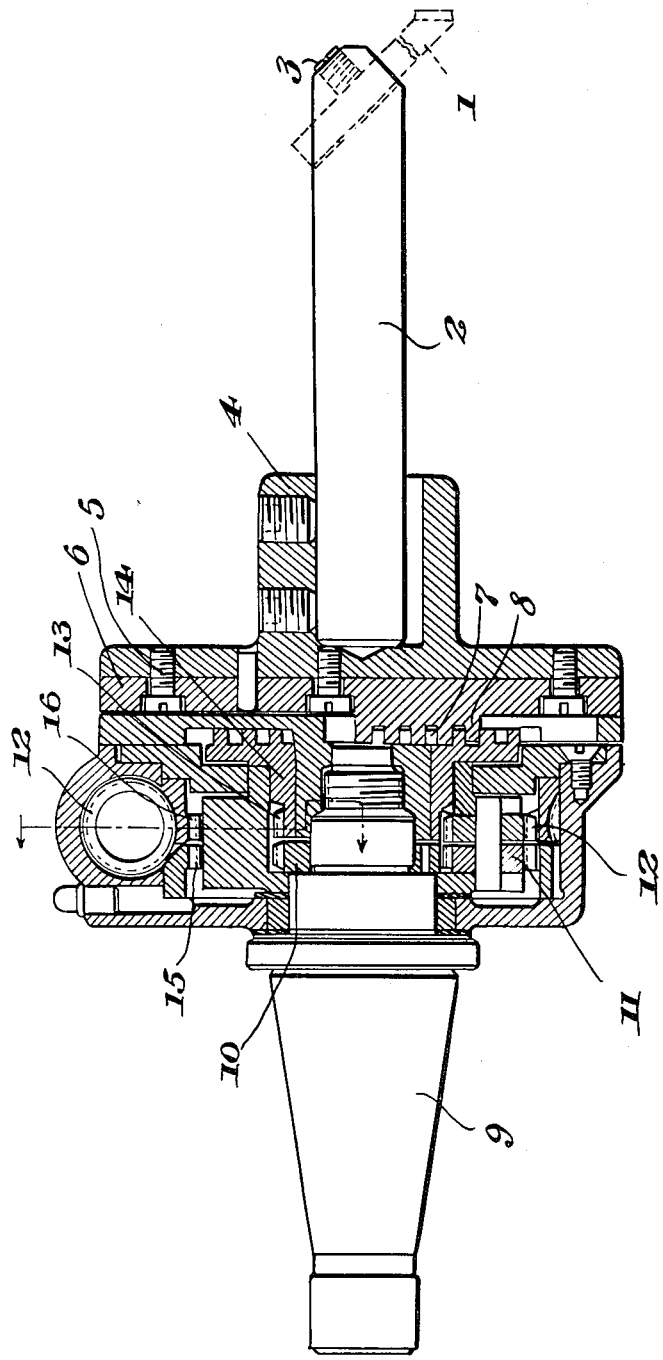
Fig. 1 is a view partly in section and partly in perspective of an embodiment of the invention.

The device according to Figs. 1–3 is an embodiment of a transversely mounted radially adjustable cutting tool adapted for a drill bore machine and used for boring, finishing groove interiors, milling, planing, etc. As shown in Fig. 1 the cutter itself, designated 1, is fixed in a supporting axle 2 by the aid of a screw 3 in a manner well known per se. The axle 2 is mounted in a support 4 which is fixed by screws 5 in a slide block 6 having cogs 8 cooperating with and being actuated by a scroll 7. The device comprises further a main drive shaft 9 adapted to be fixed in a power machine, for instance a drill boring machine. The shaft 9 is connected to one end of a series of differential gears, the scroll being connected to the other end of this gear series. Each differential consists of a sun gear 10 fixedly connected to a spindle at the inner end of the shaft 9, a set of planet gears 11, arranged around the gear 10 and another set of planet gears 12 arranged at the side of the gears 11 co-axially therewith but around another sun gear 13 arranged on an element 14 carrying the scroll 7. Around the planet gear set 11 is an internal gear 15 and around the planet gear set 12 is another internal gear 16. This latter gear 16 is arranged to be turned by the aid of a fine adjustment worm gear 17 mounted in the housing of the device and engaging the outer periphery of the gear 16.

As illustrated in Fig. 3 the worm gear 17 adapted to adjust the internal gear 16 is rotated by a hand wheel 18 and a spindle 19. The hand wheel 18 is arranged to be adjustable as to its rotation by a calibrated collar 20 as shown in Fig. 2. Co-axially with the spindle 19 of the handle wheel 18 but at the other side of the device is a handle shaft 21 serving as an auxiliary handle facilitating the governing of the tool.

The operating of the tool, i. e., the adjustment of the cutter while it is rotating during its action on the work is very simple.

The main drive shaft 9 is fixed in a power machine such as a drill boring machine. When it rotates, the sun gears 10 and 13 and consequently also the elements 14, 6 and 4 will follow with exactly the same speed, while the planet gears 11 and 12 are running around the gears 10 and 13 respectively and inside the stationary internal gears 15 and 16. When it is desired that the radial reciprocating of the cutter 1 take place, the worm gear 17 is turned by the hand wheel 18. Hereby the internal gear 16, engaged by the worm gear 17, is turned. The movement of the gear 16 causes a change in the speed of the set of planet gears 12 relative to gears 11, causing a corresponding change of the speed of revolution of the gear 13 and the element 14 fixed thereto. This element does not exactly follow the revolution of the sun gear 10 and the elements coupled therewith any longer, i. e., the slide block 6, the support 4, the axle 2 and the cutter 1. Thus a relative movement in the direction of the rotation occurs between the scroll 7 carried by the element 14 and the cogs 8 of the slide block 6, whereby the slide block 6 and thereby the support 4, the axle 2 and the cutter 1 is adjusted in radial direction.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

In a transversely mounted rotatable and radially adjustable cutter provided with a scroll actuated slide block and a differential gear mounted hand wheel in the head of said slide block, the improvement comprising a fine adjustment worm gear connecting said hand wheel to said differential, an internal gear in said differential driven by said worm gear for radial reciprocation of said cutter, while said cutter is driven by a main drive shaft, a spindle fixedly connected to said differential to serve as the calibrating base for said radial adjustment of said slide block, adjustable chucking means on said differential to fix said spindle in proper relation, and a calibrated collar on said hand wheel.

References Cited in the file of this patent

UNITED STATES PATENTS

| | | |
|---|---|---|
| 1,699,359 | Hay | Jan. 15, 1929 |
| 1,994,879 | Tweit | Mar. 19, 1935 |
| 2,093,743 | Steiner | Sept. 21, 1937 |
| 2,389,451 | Moynihan | Nov. 20, 1945 |
| 2,409,050 | Ledminka | Oct. 8, 1946 |
| 2,460,092 | Lacey et al. | Jan. 25, 1949 |
| 2,520,342 | Ross | Aug. 29, 1950 |

FOREIGN PATENTS

| | | |
|---|---|---|
| 549,904 | Germany | May 6, 1932 |
| 630,770 | Great Britain | Oct. 20, 1949 |